United States Patent
Selleck et al.

(10) Patent No.: US 11,525,546 B2
(45) Date of Patent: Dec. 13, 2022

(54) PRE-ASSEMBLED GAS PLUMBING SYSTEM AND METHODS

(71) Applicant: Chicago Gas Lines, Inc., Arlington Heights, IL (US)

(72) Inventors: Edward Selleck, Arlington Heights, IL (US); Ryan Gerstad, McHenry, IL (US)

(73) Assignee: Chicago Gas Lines, Inc., Arlington Heights, IL (US)

( * ) Notice: Subject to any disclaimer, the term of this patent is extended or adjusted under 35 U.S.C. 154(b) by 0 days.

(21) Appl. No.: 17/195,902

(22) Filed: Mar. 9, 2021

(65) Prior Publication Data

US 2021/0278049 A1 Sep. 9, 2021

Related U.S. Application Data

(60) Provisional application No. 62/986,845, filed on Mar. 9, 2020.

(51) Int. Cl.
*F17D 1/02* (2006.01)
*F16L 27/08* (2006.01)
(Continued)

(52) U.S. Cl.
CPC ............. *F17D 1/02* (2013.01); *F16L 19/08* (2013.01); *F16L 27/0808* (2013.01);
(Continued)

(58) Field of Classification Search
CPC ......... F17D 1/02; F16L 19/08; F16L 27/0808; F16L 27/0837; F16L 27/0849; F16L 21/002; F23D 14/20
See application file for complete search history.

(56) References Cited

U.S. PATENT DOCUMENTS 3,200,807 A * 8/1965 Culigan ................. F16L 11/18
126/42
3,453,009 A * 7/1969 Campbell ............. F16L 19/083
285/341
(Continued)

OTHER PUBLICATIONS

Chicago Fittings. Natural Gas Products Catalog. 20 pages.
(Continued)

*Primary Examiner* — Patrick C Williams
(74) *Attorney, Agent, or Firm* — Beem Patent Law Firm

(57) ABSTRACT

The invention relates generally to natural gas plumbing systems. More specifically, the present invention relates to a plumbing system that is preassembled to a large extent at a manufacturing site prior to shipping to the site of installation. The pre-assembled plumbing system may be used to convey gas to, for example, a fire pit, outdoor gas grill, fire bowl, gas lighting, and fire tables. The pre-assembled plumbing system may be easily installed and may include a flexible gas pipe, a transition riser, and a lead-in assembly. Further, the lead-in assembly may include a swivel joint configured to provide 360 degrees of multi-plane range of motion. The plumbing system may be coiled for storage and then transported to a site. Advantageously, the plumbing system is manufactured and sold as a single pre-assembled unit, thereby facilitating the ease and speed with which the plumbing system can be installed.

17 Claims, 4 Drawing Sheets

(51) Int. Cl.
   *F16L 19/08* (2006.01)
   *F23D 14/20* (2006.01)
   *F16L 21/00* (2006.01)

(52) U.S. Cl.
   CPC ....... *F16L 27/0837* (2013.01); *F16L 27/0849* (2013.01); *F16L 21/002* (2013.01); *F23D 14/20* (2013.01)

(56) References Cited

U.S. PATENT DOCUMENTS

| | | | | |
|---|---|---|---|---|
| 3,598,428 | A | * | 8/1971 | Smith ................ F16L 55/1011 285/341 |
| 3,858,601 | A | * | 1/1975 | Ensinger ............ F16L 27/0861 285/147.2 |
| 4,548,427 | A | * | 10/1985 | Press ................. F16L 27/107 285/55 |
| 4,942,906 | A | * | 7/1990 | Igarashi ............ F02M 37/0017 285/236 |
| 5,178,422 | A | * | 1/1993 | Sekerchak ............ F16L 27/08 285/119 |
| 5,553,893 | A | * | 9/1996 | Foti ..................... F16L 33/00 285/119 |
| 7,614,663 | B2 | * | 11/2009 | Brass ................... F16L 27/093 285/272 |
| 7,681,865 | B2 | * | 3/2010 | Furnival ............ F16K 27/067 251/293 |
| 2003/0057698 | A1 | * | 3/2003 | Parrott .................. F16L 37/23 285/1 |

OTHER PUBLICATIONS

Chicago Fittings. The X-Riser Difference webpage. 8 pages.
Gerstad, Ryan. Declaration of Inventor with Exhibit A (photos of product). Oct. 7, 2021. 8 pages.

* cited by examiner

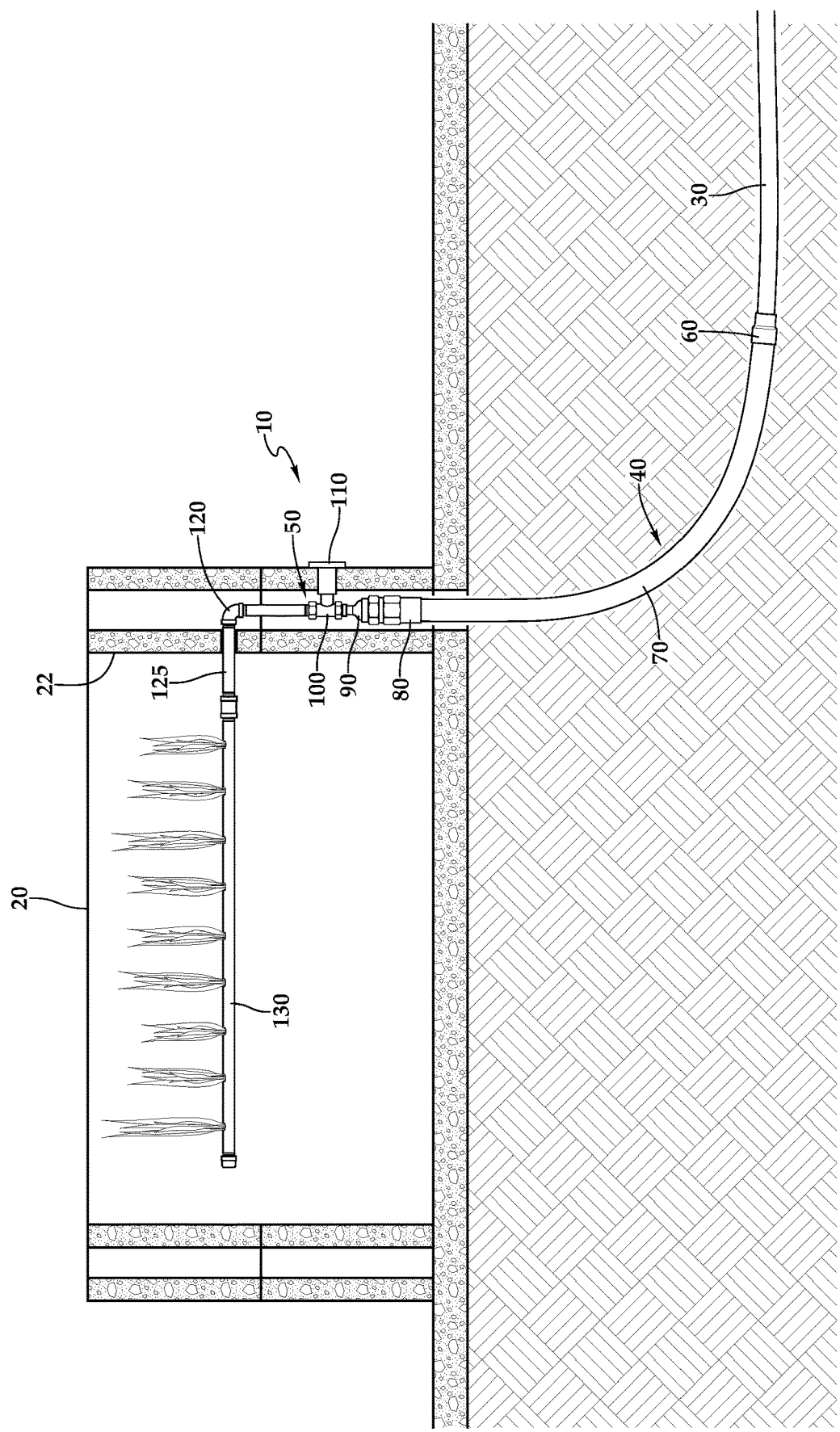

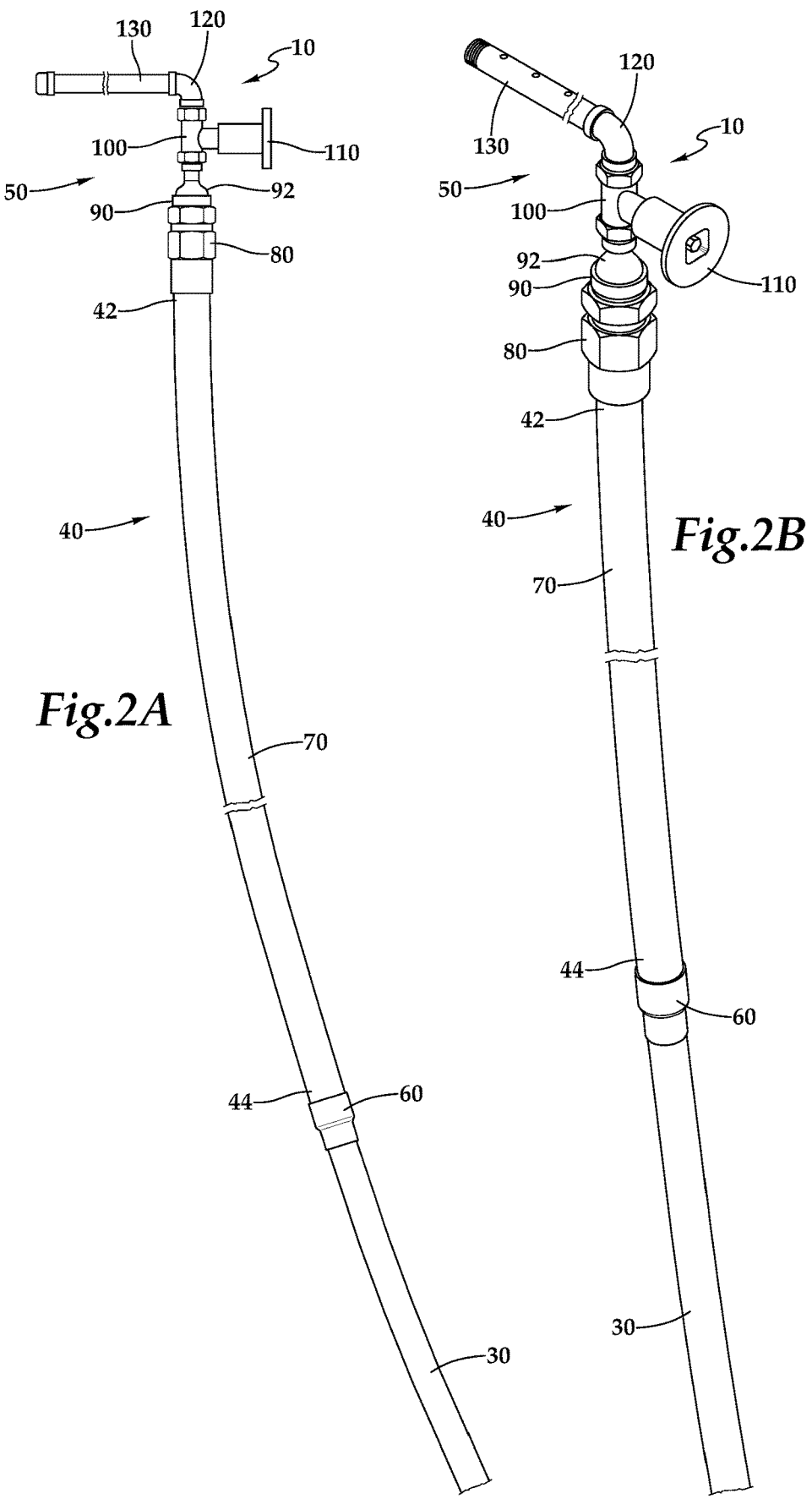

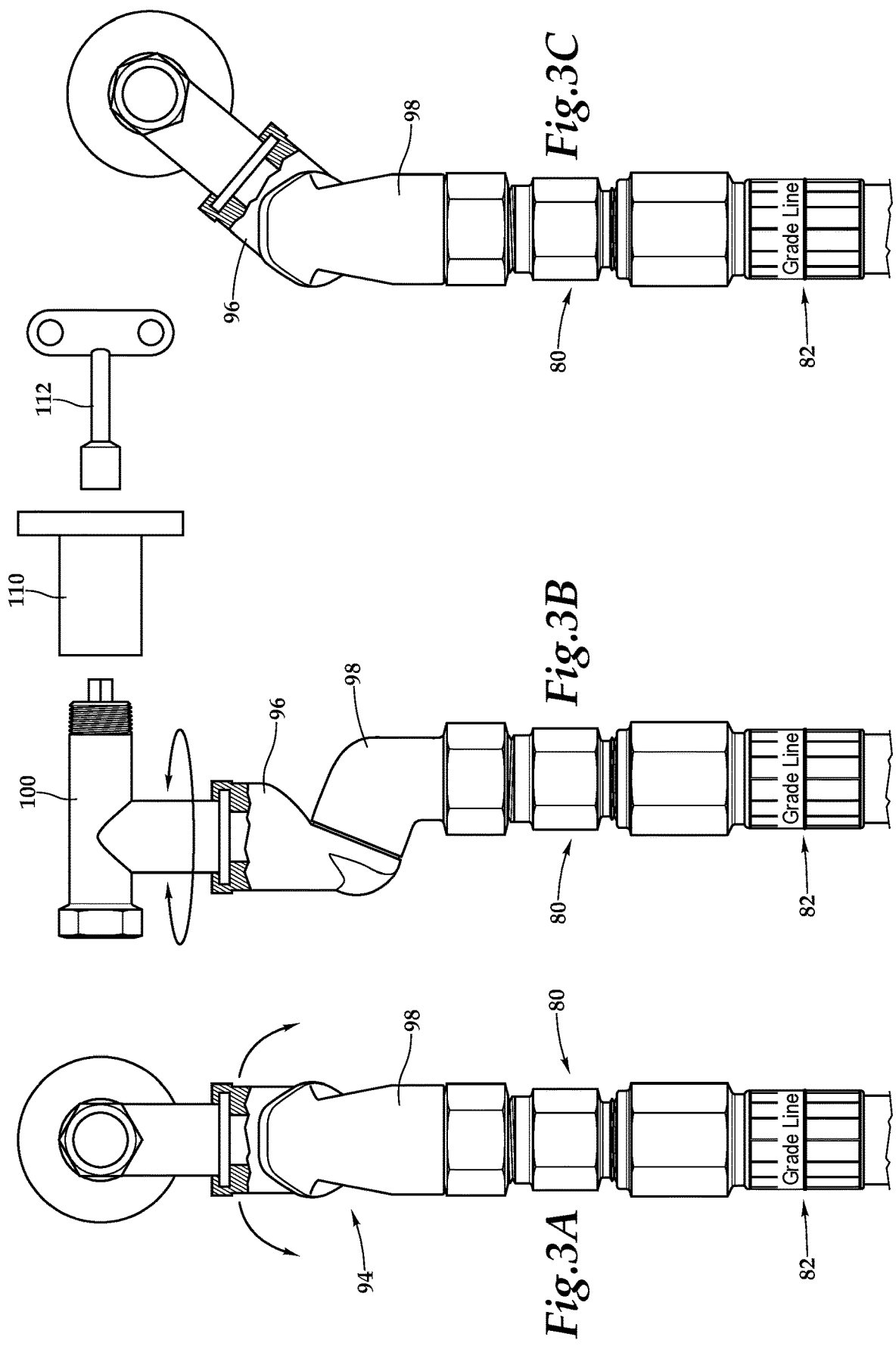

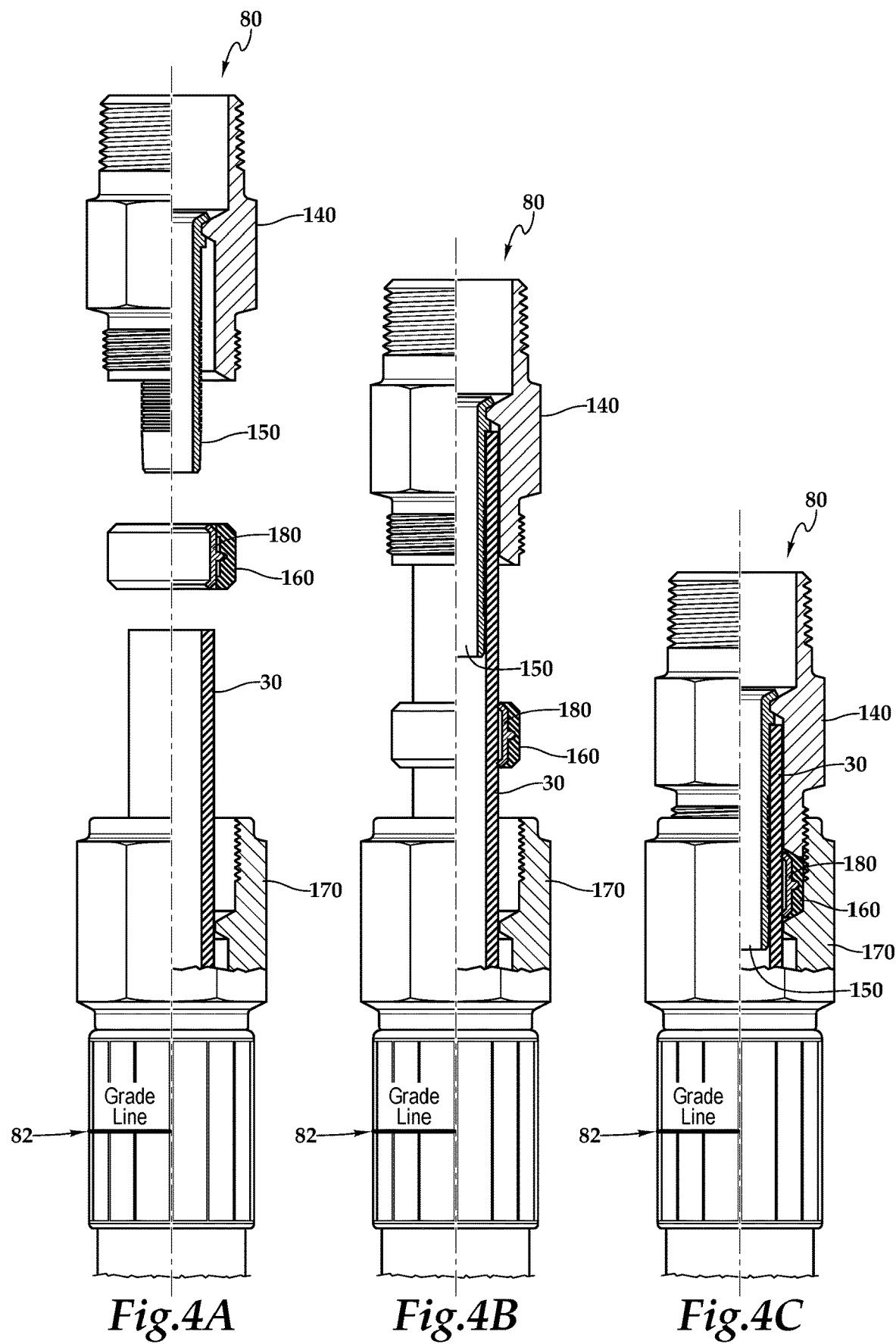
*Fig.4A*  *Fig.4B*  *Fig.4C*

PRE-ASSEMBLED GAS PLUMBING SYSTEM AND METHODS

CROSS-REFERENCE TO RELATED APPLICATIONS

This application claims benefit to U.S. Application No. 62/986,845 filed Mar. 9, 2020, which is hereby incorporated by reference in its entirety.

FIELD OF INVENTION

The invention relates generally to natural gas plumbing systems and in particular to a pre-assembled plumbing system.

BACKGROUND OF THE INVENTION

Plumbing systems often use pipes, valves, plumbing fixtures, tanks, and other apparatuses to convey fluids to an appliance. Examples of commonly used plumbing systems include heating and cooling (HVAC), waste removal, and potable water. Unlike above-grade plumbing installations, underground systems need to perform in harsh and corrosive environments.

Natural gas supply conduits for residential and industrial use are often buried several feet below the ground surface. One type of natural gas plumbing system uses black iron pipe. This piping encases a natural gas supply within a thick-walled metal pipe. As a result, accidental nail strikes don't easily puncture iron gas pipe, and it takes extreme force to bend or break the pipe.

Black iron piping is popular due to its low price. Additionally, there are a number of resources available to consumers about installing iron gas pipe or plumbers who work with iron gas pipe.

However, iron gas pipe installation is time-consuming. Plumbers must cut the rigid pipe to specific dimensions and manually or automatically thread the pipe's ends. Additionally, black iron pipe exposed to moisture can rust and corrode. In severe cases of rust, a hole can be created in the buried gas pipes such that gas escapes into the surrounding environment through the hole.

Another form of gas piping is corrugated stainless steel tubing (CSST). CSST is flexible piping that commonly runs between rigid gas supply lines and individual appliances. Although CSST's use is generally restricted to this type of application, some municipalities allow the use of CSST for entire supply systems. The pipe fittings attached to each end of a length of CSST connect to appliances or rigid pipe fittings.

Various plumbing and mechanical codes require that such installations of CSST be protected. Typically, protective conduit is placed in underground installations and the flexible piping is positioned in the protective conduit by pulling the flexible piping through the protective conduit. Pulling the flexible piping through the protective conduit on-site creates excess labor and increases the cost of installing flexible piping.

Additionally, gas lead-in assemblies are commonly employed at the location where the buried piping approaches the gas meter or other fitting mounted above grade. Traditional assembly methods include welding two or more components together. The welding operation often requires elevated temperatures, which can adversely affect any plastic or elastomeric component and increase the time and cost of installation.

To overcome some of the above disadvantages, professionals may use transitional risers to connect plastic piping with iron piping above grade. This process often includes developing a coordinated plan between a gas contractor and a builder, which may require multiple trips to the construction site, delay installation, and increase cost.

Accordingly, there is a need for a system and methods by which plumbing systems are preassembled using flexible gas piping and adjustable components for efficient installation. The present invention satisfies this need.

SUMMARY

The invention relates generally to natural gas plumbing systems and in particular to a pre-assembled plumbing system. More specifically, the present invention relates to a plumbing system that is preassembled to a large extent at a manufacturing site prior to shipping to the site of installation.

The pre-assembled plumbing system may be easily installed and may include a flexible gas pipe, a transition riser, and a lead-in assembly. The lead-in assembly may include a swivel joint configured to provide 360 degrees of multi-plane range of motion. The plumbing system may be coiled for storage and then transported to a site. Advantageously, the plumbing system is manufactured and sold as a single pre-assembled unit, thereby facilitating the ease and speed with which the plumbing system can be installed.

In one aspect, the pre-assembled plumbing system may include a transition gas riser coupled to a gas pipe. The transition gas riser may encompass a portion of the gas pipe below grade. Further, the system may include a lead-in assembly coupled to a riser head assembly of the transition gas riser. The lead-in assembly may include a swivel joint configured to rotatably couple a valve.

The gas pipe of the pre-assembled plumbing system may be a polyethylene gas pipe and/or another suitable material that is flexible material capable of being coiled prior to installation. In certain embodiments, various components of the system may be joined by heat fusion and/or mechanical type fittings.

The transition riser of the pre-assembled plumbing system may include an inner diameter that is greater than the outer diameter of the gas pipe. Further, transition gas riser may include a moisture seal configured to prevent groundwater and other contaminants from entering the radial space between the gas pipe and the transition riser. In certain embodiments, the transition gas riser may include an indicator, such as indicia for designating the position of the riser head assembly.

The riser head assembly of the pre-assembled plumbing system may include a swivel body, a stiffener, a compression ring, and a swivel nut. The compression ring may further include a spring-steel ferrule configured to form a seal.

The lead-in assembly of the preassembled plumbing system may be made of a stainless-steel material. A valve of the lead-in assembly may be a ball valve for controlling the flow of a liquid or gas. A key may be used to open and close the valve. The valve may be coupled to a burner pipe via an elbow for delivering natural gas to, for example, a fire pit.

The swivel joint of pre-assembled plumbing system may include a stationary member and a rotatable member. The rotatable member may be configured to provide 360 degrees of multi-plane range of motion. The stationary member and rotatable member may be substantially cylindrical and include a substantially elbow-shaped profile. A sealed bearing may be used to couple the stationary member to the rotatable member.

While the invention is susceptible to various modifications and alternative forms, specific exemplary embodiments thereof have been shown by way of example in the drawings and have herein been described in detail. It should be understood, however, that there is no intent to limit the invention to the particular embodiments disclosed, but on the contrary, the intention is to cover all modifications, equivalents, and alternatives falling within the scope of the invention as defined by the appended claims.

BRIEF DESCRIPTION OF THE DRAWINGS

FIG. 1 illustrates a perspective view of an exemplary pre-assembled plumbing system for conveying gas to a fire pit;

FIG. 2A illustrates a side view of the exemplary pre-assembled plumbing system;

FIG. 2B illustrates a perspective view of an exemplary pre-assembled plumbing system;

FIG. 3A illustrates an exemplary lead-in assembly including a swivel joint;

FIG. 3B illustrates a side view of a lead-in assembly including a swivel joint;

FIG. 3C illustrates a front view of a lead-in assembly including a swivel joint;

FIG. 4A illustrates a partial sectional view of the riser head assembly;

FIG. 4B illustrates a partial sectional view of the riser head assembly; and

FIG. 4C illustrate a partial sectional view of the riser head assembly.

DETAILED DESCRIPTION OF THE INVENTION

The invention relates generally to natural gas plumbing systems and in particular to a pre-assembled plumbing system. More specifically, the present invention relates to a plumbing system that is preassembled to a large extent at a manufacturing site prior to shipping to the site of installation. Advantageously, the system is ready for installation without any further assembly at the job site.

Turning to the figures, FIG. 1 illustrates an exemplary pre-assembled plumbing system 10 for conveying gas to a fire pit 20. Other configuration for use with pluming system 10 are contemplated, such as outdoor gas grills, fire bowls, gas lighting, and fire tables.

Pre-assembled plumbing system 10 may include a gas pipe 30, transition riser 40, and lead-in assembly 50. The plumbing system 10 may be coiled for storage and then transported to a site. Advantageously, the plumbing system 10 is manufactured and sold as a single pre-assembled unit, thereby facilitating the ease and speed with which the plumbing system 10 can be installed.

1.0 Exemplary Gas Pipe 30

Gas pipe 30 may be connected to a gas supply source (not shown). The connection may be formed by either a mechanical connection or various other suitable connections. The gas supply source may convey natural gas or other fluids into gas pipe 30.

Gas pipe 30 of pre-assembled system 10 may be formed of polyethylene or other suitable material that provides, for example, chemical resistance and soil burial stability. Gas pipe 30 may be virtually any length and diameter for use in a variety of applications. In addition, gas pipe 30 may be cut to a desired length at a manufacturing site prior to shipping to the site of installation.

In certain embodiments, the gas pipe 30 is joined by either heat fusion or mechanical type fittings. For example, gas pipe 30 may be joined through socket fusion, butt fusion, and/or sidewall fusion. Socket fusion includes simultaneously heating the external surface of the pipe end and internal surface of a socket fitting. Butt fusion consist of simultaneously heating the squared ends of matching surfaces, such as pipe to pipe, or pipe to fitting. Sidewall fusion includes heating both the external surface of the pipe and matching surface of a saddle type fitting. While gas pipe 30 is said to be made from polyethylene, other thermoplastics and suitable materials are contemplated.

As detailed below, gas pipe 30 extends underground from the gas supply source to couple with transition riser 40. Transition riser 40 is configured to receive and encompasses a portion of gas pipe 30. In addition, gas pipe 30 is connected above ground at a top end 42 of transition riser 40 and extends out a lower end 44 of transition riser 40 underground.

As shown in FIG. 1, at one end, a lead-in assembly 50 is coupled to transition riser 40 for conveying gas to the fire pit 20. At the other end, lead-in assembly 50 may be coupled to an output pipe that may extend out from a wall 22 of fire pit 20. As detailed below, burner pipe may output a combustible gas to, for example, light logs or simulate flames within fire pit 20.

2.0 Exemplary Transition Riser 40

FIGS. 2A and 2B further illustrate the components of the exemplary pre-assembled plumbing system 10 of FIG. 1. As shown, the transition riser 40 of plumbing system 10 includes a moisture seal 60, riser head assembly 80, and a riser conduit 70.

The lower end 44 of the transition riser 40 is closed by the moisture seal 60 that is disposed about a portion of the gas pipe 30. The moisture seal 60 is configured to prevent groundwater and other contaminants from entering the radial space between gas pipe 30 and the inside diameter of the transition riser 40.

The riser conduit 70 may have an inner diameter that is greater than an outer diameter of the gas pipe 30. The diameter of gas pipe 30 may range between about half an inch and about one and a half inch, and preferably between about one inch and about a quarter inch. The diameter of riser conduit 70 may range between about three fourths of an inch and about two inches, and preferably between about one inch and about one and a half inch.

Riser conduit 70 may be a flexible member and formed of a polymer material that is connected to the riser head assembly 80 at top end 42. For example, top end 42 may include a male thread for receiving a female thread of the lead-in assembly 50.

3.0 Exemplary Lead-in Assembly 50

As shown in FIGS. 2A and 2B, exemplary lead-in assembly 50 may then be used to deliver natural gas or other fluids from the gas pipe 30 to, for example, fire pit 20 or another appliance. In certain embodiments, lead-in assembly 50 may include a unitary structure having a generally flush appearance with, for example, one or more components seam welded.

Lead-in assembly 50 may include 150 # threaded A351 cast fittings in grades 304 stainless steel & 316 stainless steel, 3000 # threaded A182 forged stainless steel fittings in grades 304l & 316l, 3000 # socket weld A182 forged stainless steel fittings in grades 304l & 316l, O-ring unions in stainless steel, copper nickel, carbon steel, and nickel alloys, buttweld fittings A403wp-w in stainless steel grades 304l & 316l, pipe nipples NPT threaded stainless steel 304l & 316l, grooved fittings in stainless steel 304l & 316l, brass threaded fittings 125 #, and brass nipples.

More specifically, lead-in assembly 50 may include an adapter 90. As detailed below, adapter 90 may be a coupler 92, such as a bell coupler 94, or a swivel joint 96 adapter that is configured to, for example, couple riser head assembly 80 to valve 100.

3.1 Bell Coupler 92

As shown in FIGS. 2A and 2B, according to one embodiment, adapter 90 may be a reducing bell coupler 92. Bell coupler 92 may facilitate connecting fittings of different diameters. Bell coupler may allow plumbing system 10 to meet certain flow requirements and/or to adapt to existing piping of a different size.

At one end, bell coupler 92 is adapted to connect to riser head assembly 80. At the other end, a fitting, such as a ½ inch close stainless steel nipple, may be used to connect bell coupler 92 to valve 100 of the lead-in assembly 50. The fitting may include threaded ends that cooperate with the threaded openings of the bell coupler 92 and valve 100.

3.2 Swivel Joint 94

The assembly and function of swivel joint 94 which may provide for a wide range of motion lead-in assembly 50 while maintaining seals against leakage and debris is shown in FIGS. 3A-3C. In particular, swivel joint 94 may allow lead-in assembly 50 to rotate and/or pivot while also allowing for a continuous gas flow from the gas pipe 30 to, for example, fire pit 20 or another appliance. In one embodiment, swivel joint 94 may allow for increased movement at either end of lead-in assembly 50 by providing 360 degrees of multi-plane range of motion.

Swivel joint 94 may be used to, for example, facilitate installing valve 100 and cover plate 110 substantially flush with wall 22 of fire pit 20. In addition to reducing stress on other components, swivel joint 94 may allow fire pit 20 to be built around plumbing system 10, thereby eliminating a number of steps associated with the installation of conventional plumbing systems.

Swivel joint 94 may be made of any corrosion resisting materials such as galvanized steel or iron, aluminum, hard plastics, or other composite materials. The height of swivel joint 94 may range between about two inches and about eight inches, and preferably between about four inches and six inches. In one embodiment, the height of swivel joint 94 may be about five inches.

As shown, swivel joint 94 may be formed from a rotatable member 96 and a stationary member 98. Each member 96, 98 may be substantially cylindrical and have a substantially elbow-shaped profile. Stationary member 98 may be adapted to couple with riser assembly 80. For example, stationary member 98 may include a female thread for receiving a male thread of riser assembly 80. In another example, stationary member 98 may include a plated steel fitting adapted to couple with a corresponding fitting of riser assembly 80.

Rotatable member 96 of the swivel joint 94 may be rotatably coupled to stationary member 98 to form a contiguous internal flow pathway. For example, rotatable member 96 may connect with stationary member 98 through use of a sealed bearing including one or more O-rings.

As shown, rotatable member 98 of swivel joint 94 may be attached to valve 100, with which it moves. In some embodiments, swivel joint 94 may allow rotatable member 96 and valve 100, to which it is attached, as much as 360 degrees of multi-plane rotation.

Joint swivel 94 is structured is such a way that rotatable member 96 can rotate independently of stationary member 98. It is contemplated that swivel joint 94 may have more than one rotatable member that is capable of independently rotating about multiple planes.

3.1 Exemplary Valve 100

Valve 100 may be a ball valve for controlling the flow of a liquid or gas. Valve 100 may be opened when the ball's hole is in line with the flow and closed when it is pivoted 90-degrees by the cover plate 110.

Valve 100 may be opened and closed through use of a cover plate 110. Cover plate 110 may be a decorative cover and include a key 112 for opening and closing valve 100. In one instance, valve 100 is a Tomahawk 952 & 954 Series HearthMaster log lighter gas ball valve including a brass valve body, chrome-plated ball, and P.T.F.E. seats.

As shown, valve 100 also may be coupled to an elbow 120. A fitting, such as a ½ inch nipple or a ⅞ inch nipple, may connect valve 100 to elbow 120. In certain embodiments, an output pipe 125 may connect to elbow 120. The length of output pipe 125 may range between about five inches and about twenty inches, and preferably between about seven inches and about ten inches.

A burner pipe or log lighter pipe 130 may then extend from elbow 120 or output pipe 125 for delivering natural gas or other fluids. In operation, the burner pipe can be lit when the gas line is opened to, for example, produce a natural gas flame in fire pit 20.

4.0 Exemplary Riser Head Assembly

FIGS. 4A-4C illustrate partial sectional views of the riser head assembly 80. As shown, riser head assembly 80 includes a handle 140, stiffener 150, compression ring 160, and swivel nut 170.

Riser head assembly 80 may be formed from stainless steel, brass, and/or other metals. In addition, riser head assembly 80 may include an indicator 82, such as indicia, directing the positioning of the assembly above ground during installation.

Handle 140 may include a threaded top end for receiving a corresponding threaded portion of lead-in assembly 50, as detailed above. Stiffener 150 may be positioned within handle 140 and may include a series of notches for gripping to gas pipe 30.

As shown, riser head assembly 80 further includes a compression ring 160. Compression ring 160 is positioned in the cavity between the handle 140 and swivel nut 170 and adapted to secure to gas pipe 30. Specifically, compression ring 160 may include a rubber seal, which is securely locked in place by a spring-steel ferrule 180. In operation, gas pipe 30 is pushed through the swivel nut 170 and into the stiffener 150 of handle 140. Once in position, swivel nut 170 is tightened to compresses the seal and ferrule, forming a tight, leak-resistant seal.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described in the Application are to be taken as examples of embodiments. Elements and materials may be substituted for those illustrated and described in the Application, parts and processes may be reversed, and certain features of the invention may be utilized independently, all as would be apparent to one skilled in the art after having the benefit of this description of the invention. Changes may be made in the elements described in the Application without departing from the spirit and scope of the invention as described in the following claims.

What is claimed is:

1. An outdoor pre-assembled plumbing system comprising:
   a gas pipe configured to extend from below a ground level to above the ground level;
   a transition gas riser including a bottom end configured to extend below the ground level to a top end above the ground level, the bottom end and the top end of the transition gas riser are coupled to the gas pipe such that a portion of the gas pipe is encompassed by the transition gas riser from the bottom end to the top end, said gas pipe extending past the top end of said transition gas riser; and
   a lead-in assembly coupled to a riser head assembly of said transition gas riser, said lead-in assembly including a swivel joint configured to rotatably couple a valve.

2. The outdoor pre-assembled plumbing system of claim 1, wherein the gas pipe is a polyethylene gas pipe.

3. The outdoor pre-assembled plumbing system of claim 1, wherein the gas pipe is a continuous flexible pipe formed of a material capable of being coiled prior to installation.

4. The outdoor pre-assembled plumbing system of claim 1, wherein the gas pipe is joined by either heat fusion or mechanical type fittings.

5. The outdoor pre-assembled plumbing system of claim 1, wherein the transition riser has an inner diameter that is greater than an outer diameter of the gas pipe.

6. The outdoor pre-assembled plumbing system of claim 1, wherein the transition gas riser further includes a moisture seal.

7. The outdoor pre-assembled plumbing system of claim 1, wherein the transition gas riser further includes an indicator.

8. The outdoor pre-assembled plumbing system of claim 7, wherein the indicator is indicia for designating the position of the riser head assembly.

9. The outdoor pre-assembled plumbing system of claim 1, wherein the riser head assembly comprises a swivel body, a stiffener including a series of notches for gripping to said gas pipe, a compression ring, and a swivel nut.

10. The outdoor pre-assembled plumbing system of claim 9, wherein the compression ring further includes a spring-steel ferrule configured to form a seal.

11. The outdoor pre-assembled plumbing system of claim 1, wherein the lead-in assembly is a stainless steel material.

12. The outdoor pre-assembled plumbing system of claim 1, wherein the valve is a ball valve for controlling the flow of a liquid or gas.

13. The outdoor pre-assembled plumbing system of claim 1, wherein a key is used to open and close the valve.

14. The outdoor pre-assembled plumbing system of claim 1, further including an elbow attached to said valve, said elbow adapted to receive a burner pipe for delivering natural gas.

15. The outdoor pre-assembled plumbing system of claim 1, wherein said swivel joint includes a stationary member and a rotatable member, said rotatable member configured to provide 360 degrees of multi-plane range of motion.

16. The outdoor pre-assembled plumbing system of claim 15, wherein said stationary member and rotatable member are substantially cylindrical and include a substantially elbow-shaped profile.

17. The outdoor pre-assembled plumbing system of claim 15, wherein said rotatable member is coupled to said stationary member via a sealed bearing.

* * * * *